United States Patent
Hikosaka

(10) Patent No.: US 9,232,099 B1
(45) Date of Patent: Jan. 5, 2016

(54) IMAGE READING DEVICE

(71) Applicant: KYOCERA Document Solutions Inc., Osaka-shi (JP)

(72) Inventor: Ariyoshi Hikosaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/739,777

(22) Filed: Jun. 15, 2015

(30) Foreign Application Priority Data

Jun. 27, 2014 (JP) ................................. 2014-132054

(51) Int. Cl.
- *G06K 15/00* (2006.01)
- *H04N 1/00* (2006.01)
- *H04N 1/44* (2006.01)
- *H04N 1/40* (2006.01)
- *H04N 1/04* (2006.01)

(52) U.S. Cl.
CPC ......... *H04N 1/00649* (2013.01); *H04N 1/0057* (2013.01); *H04N 1/00663* (2013.01); *H04N 1/00724* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| 8,941,864 B2 * | 1/2015 | Hirohata | G06K 9/00449 348/135 |
| 2009/0086289 A1 * | 4/2009 | Tsujimoto | H04N 1/04 358/498 |
| 2010/0110484 A1 * | 5/2010 | Hikosaka | H04N 1/00846 358/1.15 |

FOREIGN PATENT DOCUMENTS

JP 2009-089254 A 4/2009

* cited by examiner

*Primary Examiner* — Ashish K Thomas
*Assistant Examiner* — Neil R McLean
(74) *Attorney, Agent, or Firm* — Studebaker & Brackett PC

(57) ABSTRACT

An image reading device includes a document conveyance section, a reading section, a determination section, an operation control section, a reading instruction request section, and a reading instruction reception section. The determination section determines whether a document sheet is an identifier sheet indicating identification information for identifying an information processing device that is a communication target. The reading instruction request section communicates with the information processing device identified by the identification information, thereby requesting the information processing device for an instruction pertaining to document reading. Upon the reading instruction reception section receiving the instruction, the operation control section causes the reading section to perform document reading in accordance with a reading setting indicated by the instruction in order to generate image data for document sheets from a document sheet directly after the identifier sheet through to a document sheet directly prior to a next identifier sheet.

7 Claims, 15 Drawing Sheets

IMAGE READING DEVICE

INCORPORATION BY REFERENCE

The present application claims priority under 35 U.S.C. §119 to Japanese Patent Application No. 2014-132054, filed Jun. 27, 2014. The contents of this application are incorporated herein by reference in their entirety.

BACKGROUND

The present disclosure relates to image reading devices and in particular relates to a technique of generating image data by reading document sheets loaded on a document loading table.

A generic image reading device is not able to simultaneously read a plurality of documents and thus in a situation in which the image reading device is already reading a document, it is necessary to wait until reading of the document is complete before inputting an instruction for reading another document. A document reading instruction is typically input through operation buttons provided on the image reading device. Therefore, a user inconveniently has to wait by the image reading device until a previously input document reading instruction is complete. In one example of an image reading device that has been proposed to tackle such inconvenience, separator sheets are loaded between different documents that are reading targets and image data of read document sheets is stored as a single file each time a separator sheet is read. Therefore, a user can cause an individual file to be stored for each document by loading separator sheets between the different documents. As a consequence, it is not necessary for the user to wait by the image reading device until a previously input document reading instruction is complete.

SUMMARY

An image reading device according to one aspect of the present disclosure includes a document conveyance section, a reading section, a determination section, an operation control section, a reading instruction request section, and a reading instruction reception section. The document conveyance section conveys, one by one, document sheets loaded on a document loading table. The reading section generates image data by reading a document sheet conveyed by the document conveyance section. The determination section determines whether or not the document sheet read by the reading section is an identifier sheet that indicates identification information for identifying, on a network, an information processing device that is a communication target. The operation control section controls a document conveying operation of the document conveyance section and a document reading operation of the reading section. The operation control section causes suspension of the document conveying operation and the document reading operation upon the determination section determining that the document sheet read by the reading section is an identifier sheet. Upon the determination section determining that the document sheet read by the reading section is an identifier sheet, the reading instruction request section communicates with the information processing device identified by the identification information indicated by the identifier sheet, thereby requesting the information processing device for an instruction pertaining to document reading. The reading instruction reception section receives an instruction pertaining to document reading that is transmitted from the information processing device. Upon the reading instruction reception section receiving the instruction pertaining to document reading, the operation control section causes restarting of the document conveying operation of the document conveyance section and the document reading operation of the reading section. The operation control section also causes the reading section to perform document reading in accordance with a reading setting indicated by the instruction pertaining to document reading in order to generate image data for document sheets from a document sheet directly after the identifier sheet determined by the determination section through to a document sheet directly prior to a next identifier sheet determined by the determination section, or through to a final document sheet loaded on the document loading table.

DETAILED DESCRIPTION

Figure 1:
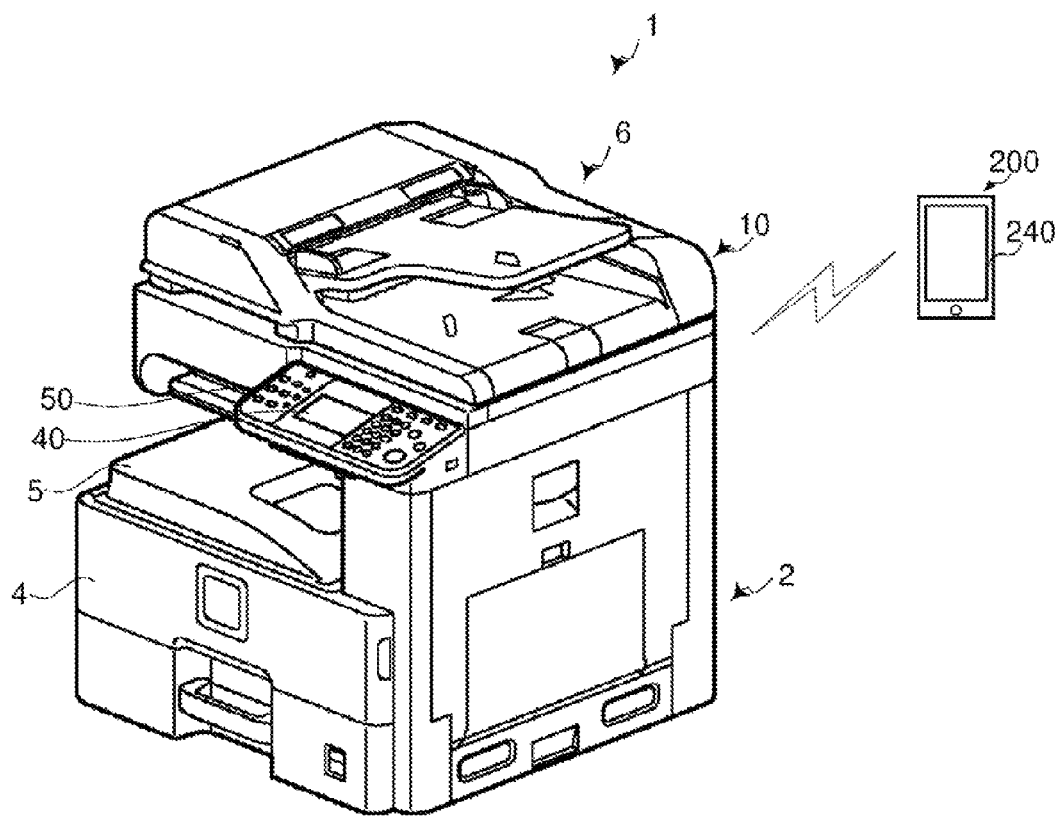
FIG. 1 is a perspective diagram illustrating external appearance of an information processing device and an image forming apparatus which is an example of an image reading device according to an embodiment of the present disclosure.
Figure 2:
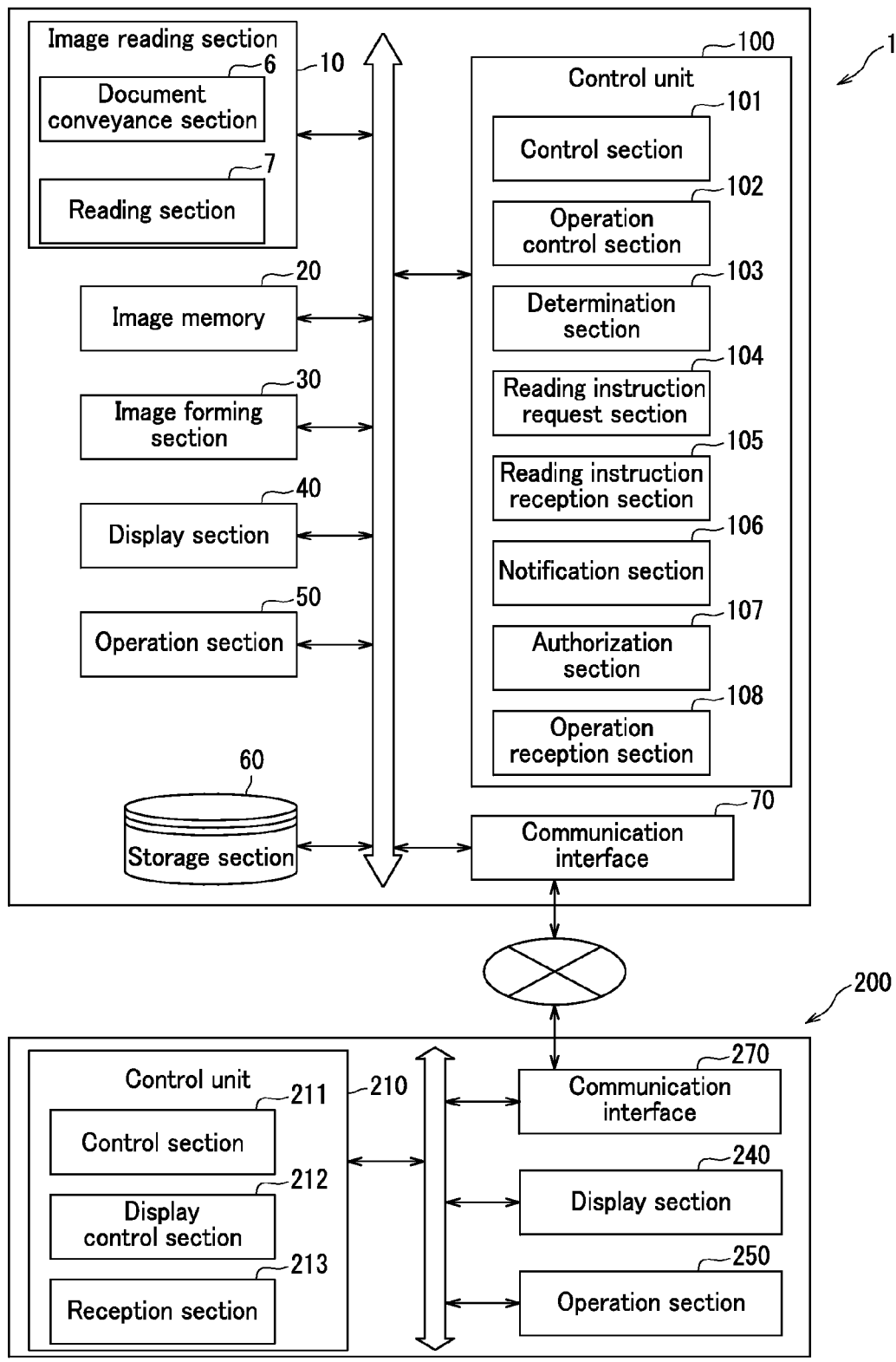
FIG. 2 is a block diagram illustrating internal configuration of the information processing device and the image forming apparatus according to the embodiment of the present disclosure.

The following explains an image reading device according to an embodiment of the present disclosure with reference to the drawings. FIG. 1 is a perspective diagram illustrating external appearance of an information processing device and an image forming apparatus which is an example of the image reading device according to the embodiment of the present disclosure. FIG. 2 is a block diagram illustrating internal configuration of the information processing device and the image forming apparatus according to the embodiment of the present disclosure.

An image forming apparatus 1 is a multifunction peripheral that combines various functions such as a facsimile communication function, a copy function, a print function, and a scan function. As illustrated in FIG. 1, the image forming apparatus 1 is roughly formed from a main body 2 and an image reading section 10 located above the main body 2.

The image reading section 10 includes a document conveyance section 6 and a reading section 7 that optically reads document sheets.

A display section 40 including a liquid-crystal display (LCD) is located at a front side of the image forming apparatus 1.

An operation section 50 for example includes number input keys for number input and receives operations from a user with respect to a screen displayed by the display section 40.

A storage section 60 is a large capacity storage device such as a hard disk drive (HDD). Image data generated through reading by the image reading section 10 is stored in the storage section 60 in a file format set by reading settings.

The image forming apparatus 1 is connected to an information processing device 200, such as a portable terminal or a PC, via a network. A communication interface 70 performs transceiving of data with the information processing device 200 connected thereto based on control by a reading instruction request section 104 described further below.

The image forming apparatus 1 further includes a control unit 100. The control unit 100 functions as a control section 101, an operation control section 102, a determination section 103, the reading instruction request section 104, a reading instruction reception section 105, a notification section 106, an authorization section 107, and an operation reception section 108 through execution by a CPU of a control program, such as an image reading control program, stored in the storage section 60 or ROM.

The control section 101 control overall operation of the image forming apparatus 1.

The operation control section 102 has a function of controlling a document conveying operation of the document conveyance section 6 and a document reading operation of the reading section 7. The operation control section 102 also has a function of controlling image formation operation of an image forming section 30 in order to cause the image forming section 30 to print a scan separator sheet. The scan separator sheet is explained in detail further below with reference to FIG. 3.

The determination section 103 has a function of determining whether or not a document sheet read by the reading section 7 is a scan separator sheet (i.e., an identifier sheet).

The determination section 103 determines whether or not a pattern image P is printed on the document sheet read by the reading section 7 by performing image analysis, such as pattern matching, on image data of the document sheet read by the reading section 7. The determination section 103 determines that a document sheet having the pattern image P printed thereon is a scan separator sheet and determines that a document sheet not having the pattern image P printed thereon is a normal reading target document sheet.

Figure 3:
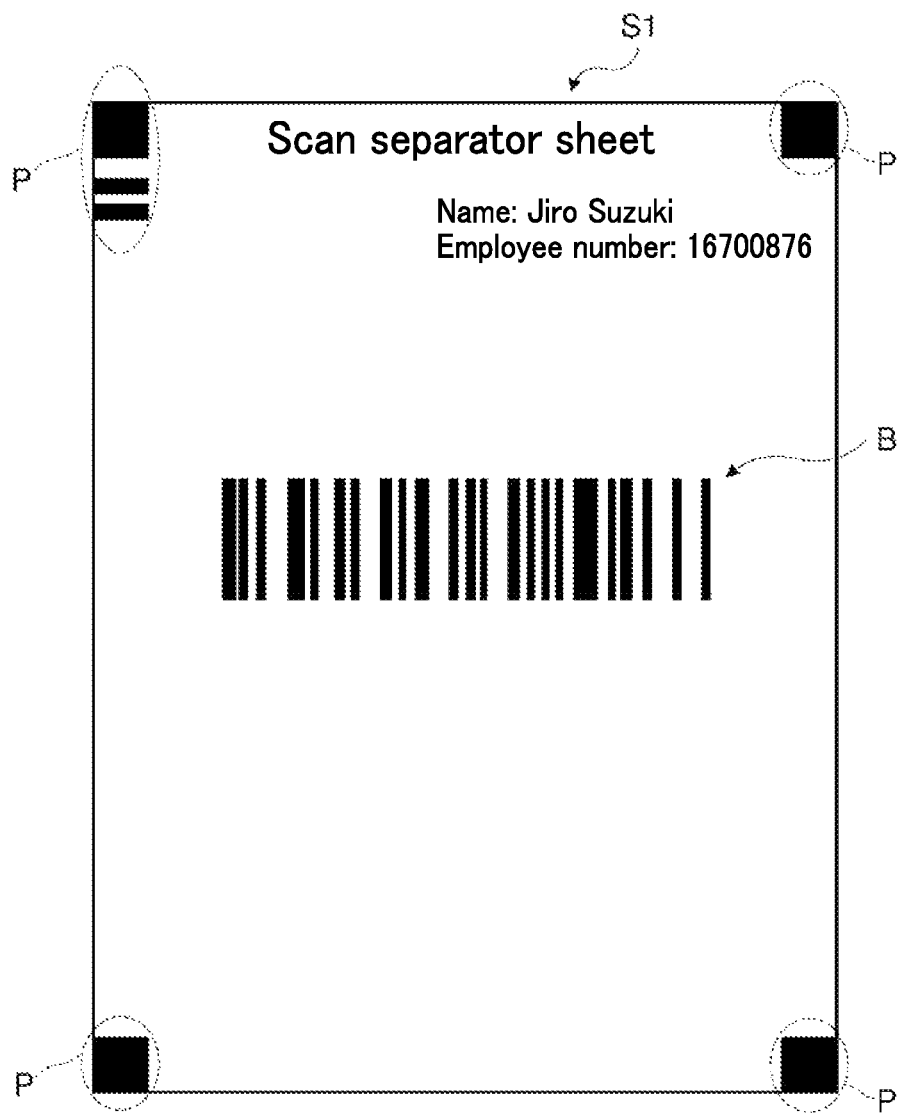
FIG. 3 illustrates an example of content of a scan separator sheet.

FIG. 3 illustrates an example of content of the scan separator sheet. The scan separator sheet (identifier sheet) indicates identification information, such as a MAC address, for identifying, on the network, the information processing device 200 which is a communication target. A scan separator sheet S1 illustrated in FIG. 3 has the preset pattern image P and a barcode image B indicating the identification information printed thereon.

Figure 4:
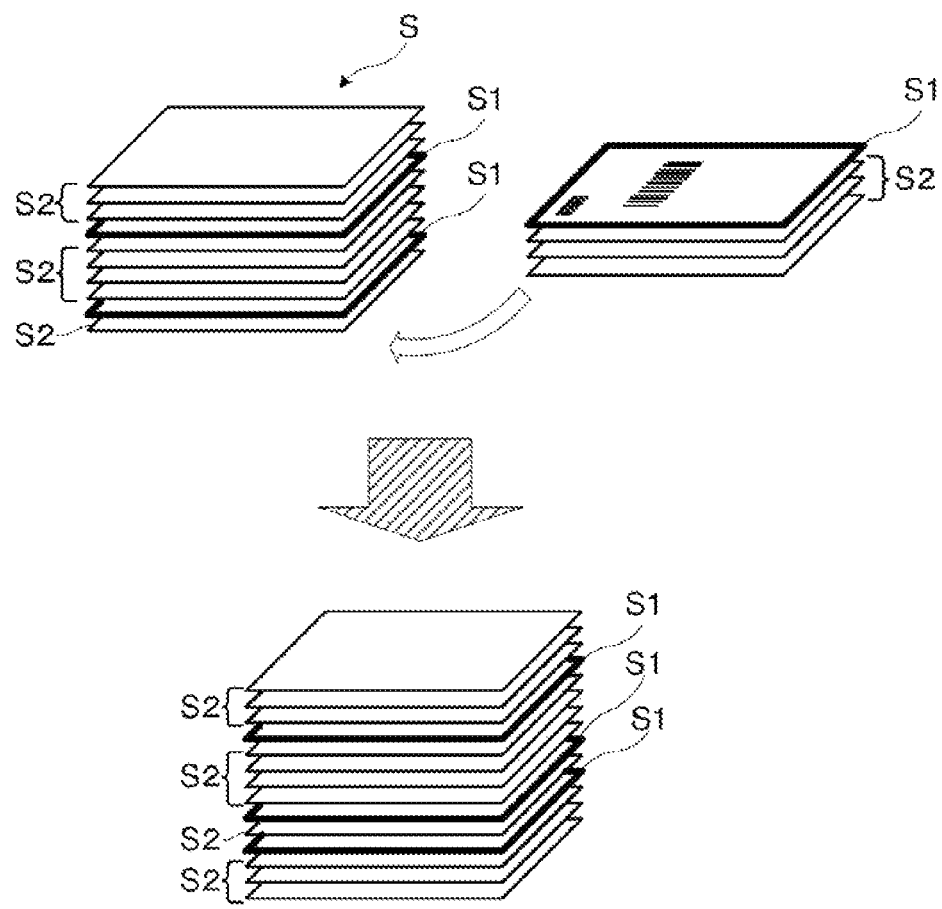
FIG. 4 illustrates an example of document sheets loaded on a document loading table.

FIG. 4 illustrates an example of document sheets loaded on a document loading table. When reading target document sheets S2 are to be loaded onto the document loading table for reading, a situation may arise in which other document sheets S are already loaded on the document loading table. In such a situation, a user can use a scan separator sheet S1 to separate the reading target document sheets S2 from the other document sheets. In other words, as illustrated in FIG. 4, the user places a scan separator sheet S1 on top of the reading target document sheets S2 and inserts the scan separator sheet S1 and the document sheets S2 below a lowermost of the document sheets S already loaded on the document loading table. Note that the scan separator sheet S1 indicates identification information for identifying the information processing device 200 used by the user. Through the above, document sheets are loaded on the document loading table in a state illustrated in the lower portion of FIG. 4.

Each time the reading section 7 reads a scan separator sheet S1, the operation control section 102 causes temporary suspension of a document conveying operation of the document conveyance section 6 and a document reading operation of the reading section 7. Upon the reading instruction reception section 105, which is described further below, receiving an instruction pertaining to document reading, the operation control section 102 causes restarting of the document conveying operation of the document conveyance section 6 and the document reading operation of the reading section 7, and causes the reading section 7 perform document reading in accordance with reading settings indicated by the instruction in order to generate image data.

The reading instruction request section 104 has a function of requesting the information processing device 200 connected via the network for an instruction pertaining to document reading. More specifically, in a situation in which the determination section 103 determines that a document sheet read by the reading section 7 is a scan separator sheet, the reading instruction request section 104 acquires identification information from the scan separator sheet. Next, the reading instruction request section 104 performs communication, via the communication interface 70, with the information processing device 200 identified by the acquired identification information, thereby transmitting a control signal to the information processing device 200 that requests an instruction pertaining to document reading.

In the information processing device 200, the aforementioned control signal is received by a control section 211 of a control unit 210, via a communication interface 270. A display control section 212 causes a display section 240 to display a settings screen based on the received control signal.

Figure 5:
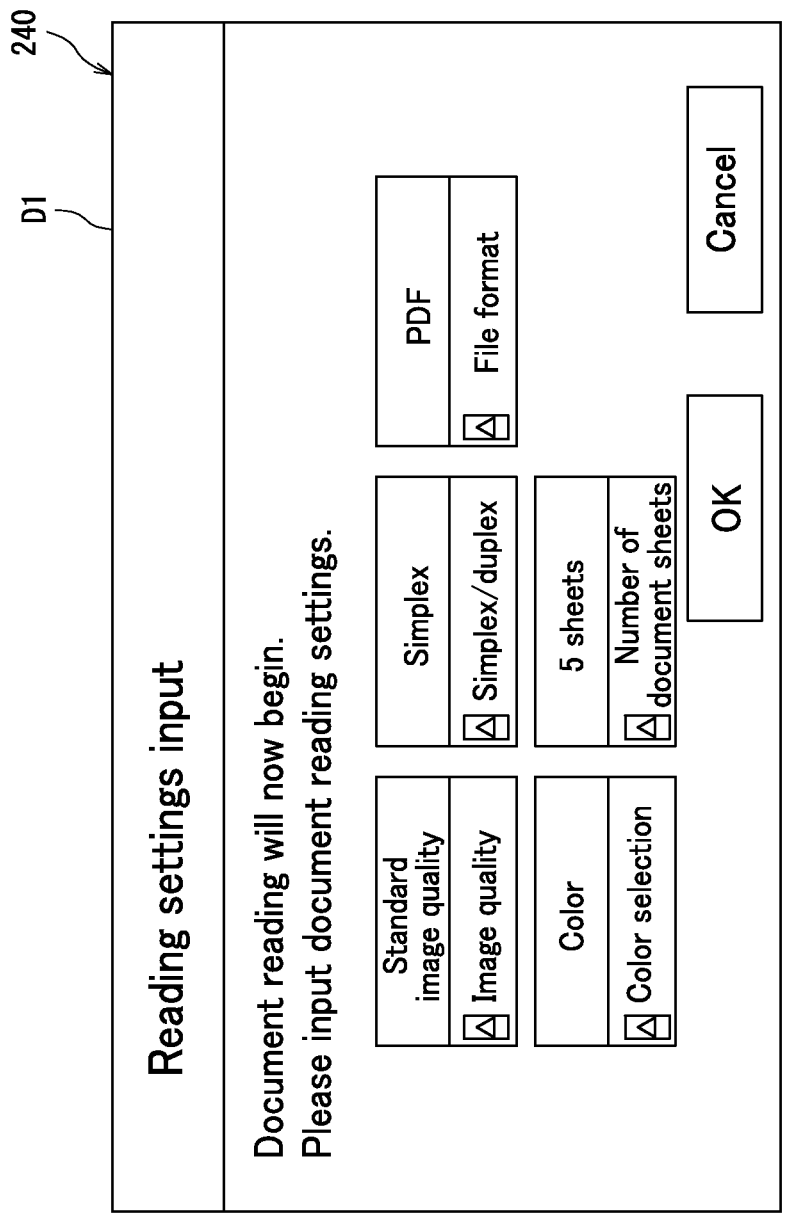
FIG. 5 illustrates an example of content of a settings screen.

FIG. 5 illustrates an example of content of the settings screen. In the example illustrated in FIG. 5, five items are displayed in a settings screen D1. The five items are "Document reading quality", "Simplex/duplex reading", "Image data file format", "Image data color selection", and "Number of document sheets to be read". A reception section 213 receives an instruction pertaining to document reading based on user operations input with respect to the settings screen using, for example, an operation section 250. The control section 211 transmits the instruction received by the reception section 213 to the image forming apparatus 1, via the communication interface 270.

The reading instruction reception section 105 has a function of receiving, via the communication interface 70, the instruction pertaining to document reading that is transmitted from the information processing device 200.

The notification section 106 has a function of notifying an error message or the like to a user in a situation in which an error occurs in the image forming apparatus 1, for example during a document reading operation.

The authorization section 107 has a function of performing user authorization based on preset authorization data that, for example, is stored in the storage section 60.

The operation reception section 108 has a function of receiving user operations that are for example input using the operation section 50.

Figure 6:
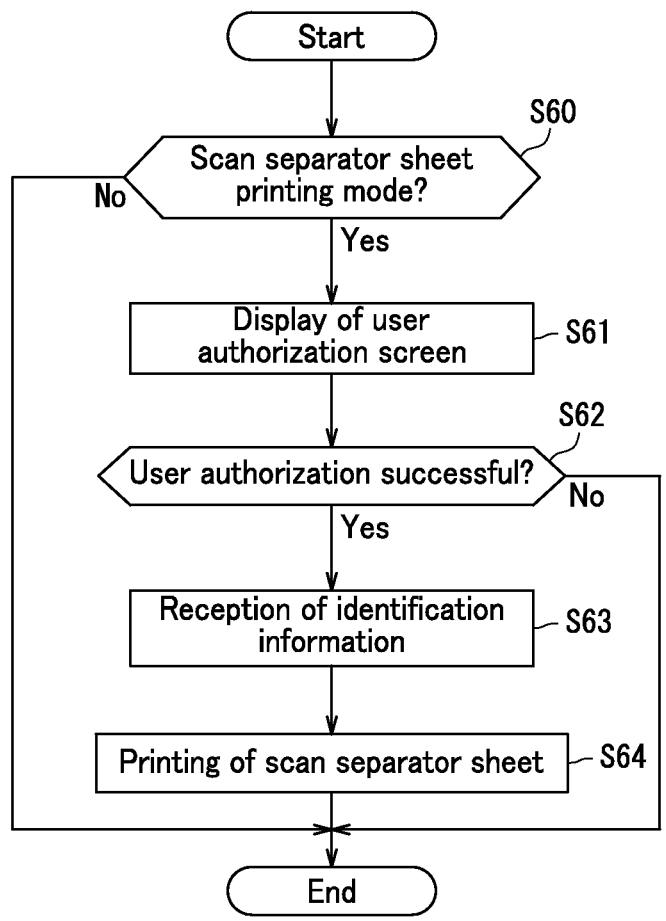
FIG. 6 is a flowchart illustrating operational flow of the image forming apparatus according to the embodiment of the present disclosure during a scan separator sheet issue process.

The following explains specific operational flow of the image forming apparatus 1 and the information processing device 200 configured as described above. First explanation is provided of a scan separator sheet issue process. FIG. 6 is a flowchart illustrating operational flow of the image forming apparatus 1 during the scan separator sheet issue process.

The operation control section 102 of the image forming apparatus 1 determines whether or not an operating mode of the image forming apparatus 1 is a scan separator sheet printing mode (Step S60). The term "scan separator sheet printing mode" refers to an operating mode for printing a scan separator sheet. The image forming apparatus 1 switches from a normal operating mode to the scan separator sheet printing mode upon the operation reception section 108 receiving a preset user operation, for example using the operation section 50.

When the operating mode of the image forming apparatus 1 is the scan separator sheet printing mode (Step S60: Yes), the operation control section 102 causes the display section 40 to display a user authorization screen (Step S61).

Figure 7:
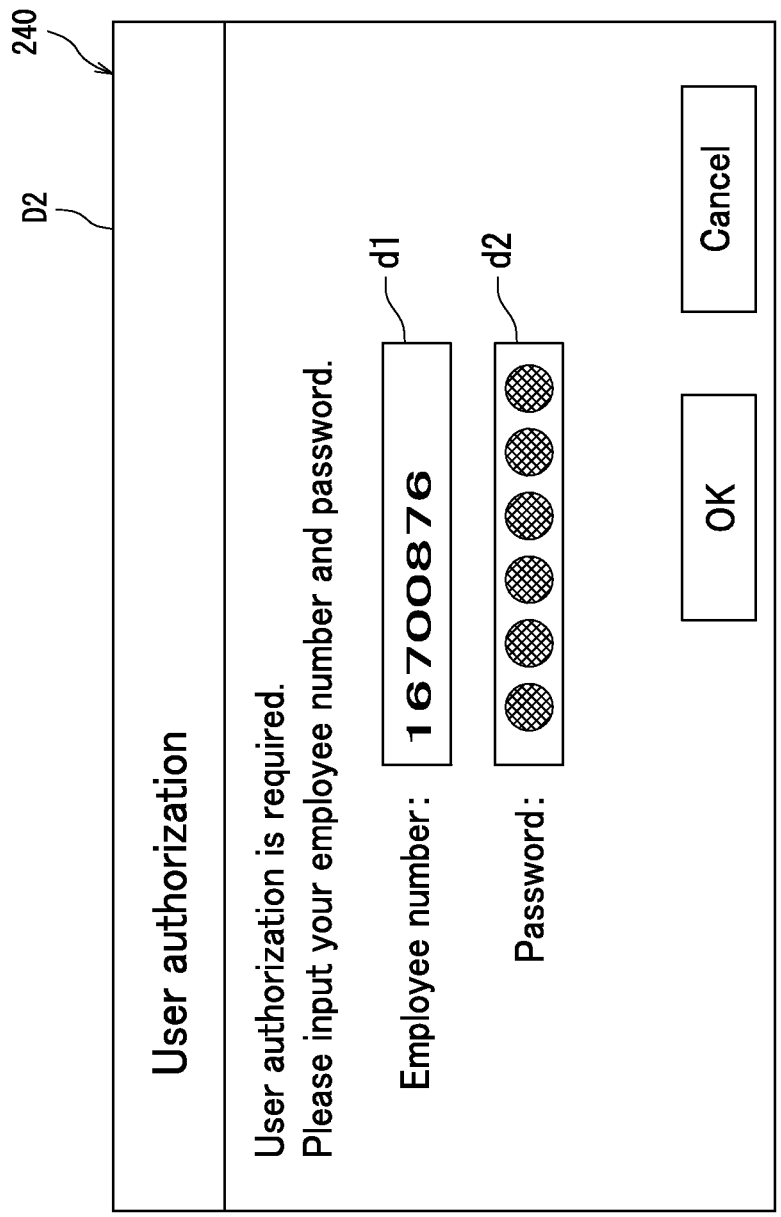
FIG. 7 illustrates an example of content of a user authorization screen.

FIG. 7 illustrates an example of content of the user authorization screen. In the example illustrated in FIG. 7, a user authorization screen D2 includes an input field d1 for inputting a user's employee number and an entry field d2 for inputting a password. The storage section 60 stores, as authorization data, employee numbers and passwords for which issuing of a scan separator sheet is permitted. The authorization section 107 determines whether an employee number and a password received by the operation reception section 108 through the user authorization screen D2 match an employee number and a password stored by the storage section 60. The authorization section 107 determines that user authorization is successful in a situation in which the employee numbers and the passwords match.

Although the above explanation is for an example in which user authorization is performed using a user's employee number and a password, the present disclosure is not limited to such a configuration. For example, an image forming apparatus may include a card reader that reads card information through a technique such RFID (Radio Frequency IDentification). In such a situation, user authorization may be performed using card information that is for example read by the card reader from a user's employee identification card.

The following continues explanation of operation during the scan separator sheet issue process with reference to FIG. 6. In a situation in which user authorization fails (Step S62: No), the scan separator sheet issue process ends. On the other hand, in a situation in which user authorization is successful (Step S62: Yes), the operation reception section 108 receives identification information, such as a MAC address, based on a user operation that is for example input using the operation section 50 (Step S63).

Next, the operation control section 102 causes the image forming section 30 to print a scan separator sheet indicating the identification information received in processing of Step S63 (Step S64). In the example illustrated in FIG. 3, the operation control section 102 performs processing in order to convert the identification information received in processing of Step S63 into a barcode.

Figure 8:
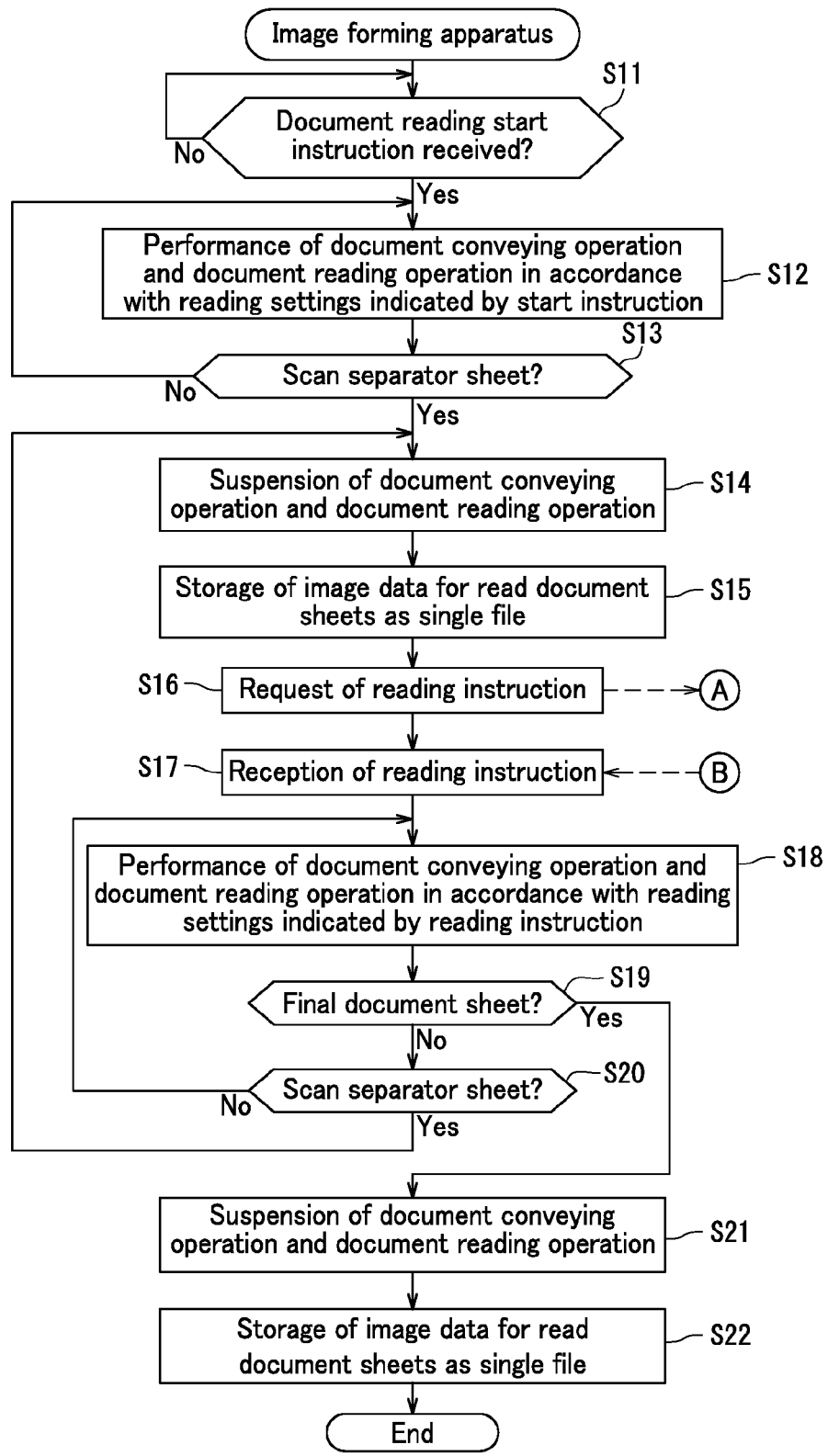
FIG. 8 is a flowchart illustrating operational flow of the information processing device and the image forming apparatus according to the embodiment of the present disclosure during a document reading process.
Figure 9:
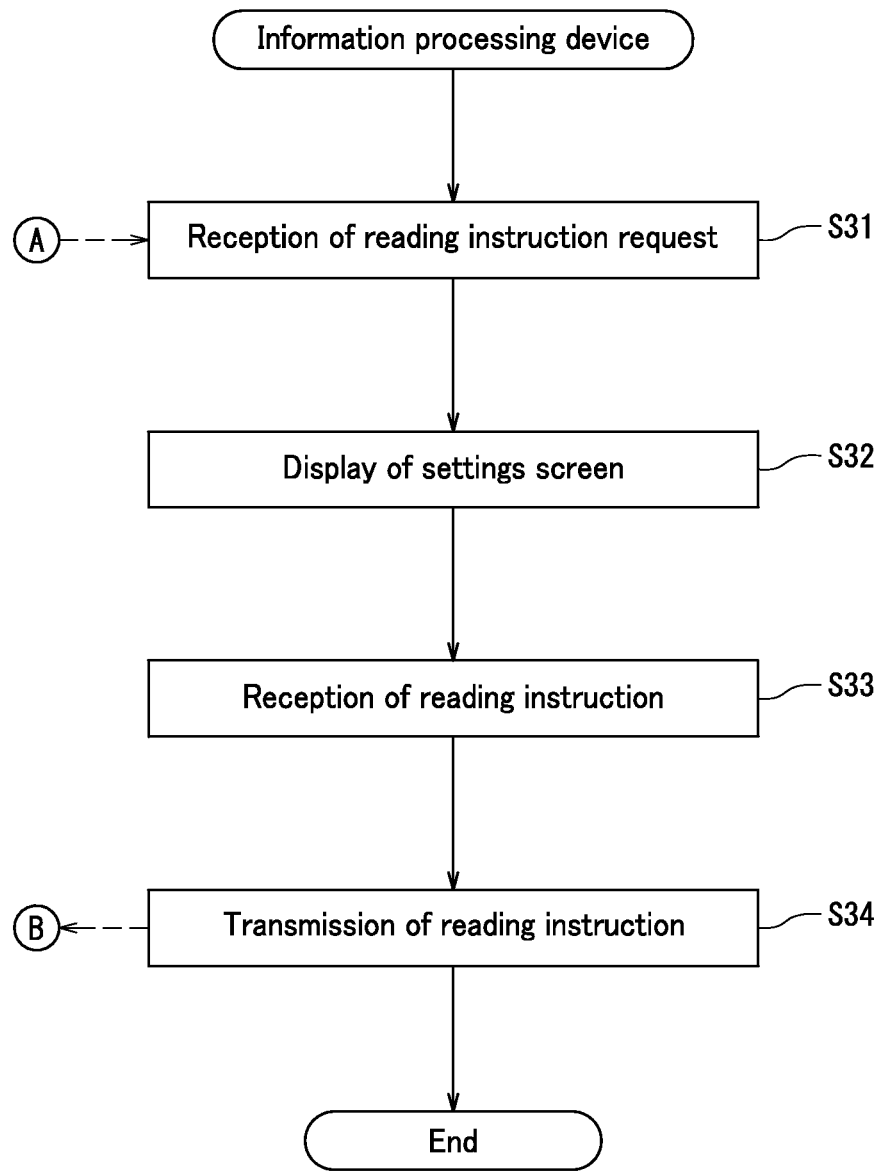
FIG. 9 is a flowchart illustrating operational flow of the information processing device and the image forming apparatus according to the embodiment of the present disclosure during the document reading process.

The following explains a document reading process. FIGS. 8 and 9 are flowcharts illustrating operational flow of the image forming apparatus 1 and the information processing device 200 during the document reading process.

The operation control section 102 of the image forming apparatus 1 determines whether or not the operation reception section 108 has received a document reading start instruction based on a user operation that is for example input using the operation section 50 (Step S11). In contrast to a reading instruction input when a scan separator sheet is read (explained further below), which is input to the information processing device 200, the aforementioned document reading start instruction is input to the image forming apparatus 1.

Upon the operation reception section 108 receiving a document reading start instruction (Step S11: Yes), the operation control section 102 causes the document conveyance section 6 to perform a document conveying operation and the reading section 7 to perform a document reading operation in accordance with reading settings indicated by the document reading start instruction received in processing of Step S11 (Step S12). In other words, the operation control section 102 causes the document conveyance section 6 to convey, one by one, document sheets loaded on the document loading table and causes the reading section 7 to read the document sheets conveyed one by one by the document conveyance section 6 in order to generate image data. The operation control section 102 causes storage of the image data generated by the reading section 7 in an image memory 20.

Next, the determination section 103 determines whether or not a document sheet read by the reading section 7 in processing of Step S12 is a scan separator sheet (Step S13).

In a situation in which the read document sheet is not a scan separator sheet (Step S13: No), the process returns to processing of Step S12 and the operation control section 102 causes performance of a document conveying operation and a document reading operation.

On the other hand, in a situation in which the read document sheet is a scan separator sheet (Step S13: Yes), the operation control section 102 causes suspension of the document conveying operation of the document conveyance section 6 and the document reading operation of the reading section 7 (Step S14).

Also, with respect to image data generated through reading of document sheets in processing of Step S12 from a first document sheet loaded on the document loading table through to a document sheet directly prior to the scan separator sheet, the operation control section 102 causes storage of the image data as a single file in the storage section 60 (Step S15). In Step S15, the operation control section 102 causes storage of the image data in the storage section 60 as a file format in accordance with reading settings indicated by the document reading start instruction.

After processing of Step S15, the reading instruction request section 104 acquires identification information from the scan separator sheet and performs communication with the information processing device 200 identified by the acquired identification information, thereby transmitting a control signal to the information processing device 200 that requests an instruction pertaining to document reading (Step S16).

The control section 211 of the information processing device 200 receives, via the communication interface 270, the control signal requesting a reading instruction that has been transmitted from the image forming apparatus 1 (Step S31 in FIG. 9). The display control section 212 subsequently causes the display section 240 to display the settings screen based on the received control signal (Step S32).

The reception section 213 receives an instruction pertaining to document reading that is input through the settings screen displayed in processing of Step S32 (Step S33). The control section 211 subsequently transmits the aforementioned instruction, which has been received by the reception section 213, to the image forming apparatus 1, via the communication interface 270 (Step S34).

The reading instruction reception section 105 of the image forming apparatus 1 receives, via the communication interface 70, the instruction pertaining to document reading that is transmitted from the information processing device 200 (Step S17 of FIG. 8).

Next, the operation control section 102 causes the document conveyance section 6 to perform a document conveying operation and the reading section 7 to perform a document reading operation in accordance with reading settings indicated by the instruction pertaining to document reading that is received in processing of Step S17 (Step S18). Note that in a situation in which there is a setting item for which a reading setting is not set for the instruction pertaining to document reading, the operation control section 102 causes the document conveyance section 6 to perform the document conveying operation and the reading section 7 to perform the document reading operation in accordance with a default setting for the setting item that is for example stored in the storage section 60.

Next, the determination section 103 determines whether or not the document sheet read by the reading section 7 in processing of Step S18 is a final document sheet loaded on the document loading table (Step S19). For example, when the reading section 7 cannot read a document image even though a paper feed roller or a separating roller of the document conveyance section 6 is rotating, the determination section 103 determines that a document sheet conveyed during a directly prior document conveying operation is the final document sheet.

In a situation in which the read document is the final document sheet (Step S19: Yes), the operation control section 102 causes suspension of the document conveying operation of the document conveyance section 6 and the document reading operation of the reading section 7 (Step S21).

Next, with respect to image data generated for documents sheets from a document sheet directly after the scan separator sheet determined in processing of Step S13 through to the final document sheet loaded on the document loading table, the operation control section 102 causes storage of the image data as a single file in the storage section 60 (Step S22). In Step S22, the operation control section 102 causes storage of the image data in the storage section 60 as a file format in accordance with the reading settings indicated by the reading instruction received in processing of Step S17.

On the other hand, in a situation in which the read document sheet is not the final document sheet (Step S19: No), the determination section 103 determines whether or not the document sheet read by the reading section 7 in processing of Step S18 is a scan separator sheet (Step S20).

In a situation in which the read document sheet is not a scan separator sheet (Step S20: No), the process returns to processing of Step S18 and the operation control section 102 causes performance of a document conveying operation and a document reading operation.

In a situation in which the read document sheet is a scan separator sheet (Step S20: Yes), the process returns to processing of Step S14 and the operation control section 102 causes suspension of the document conveying operation of the document conveyance section 6 and the document reading operation of the reading section 7. Next, with respect to image data generated for document sheets from a document sheet directly after the scan separator sheet determined in processing of Step S13 through to a document directly prior to the scan separator sheet determined in processing of Step S20, in processing of Step S15 the operation control section 102 causes storage of the image data as a single file in the storage section 60.

As explained above, according to the image forming apparatus 1 of the embodiment of the present disclosure, in a situation in which document reading is already being performed with respect to other document sheets loaded on the document loading table, a user places a scan separator sheet on top of document sheets that are reading targets and then inserts the documents sheets and the scan separator sheet under a lowermost of the document sheets already loaded on the document loading table. As a result, an instruction pertaining to document reading is requested from the information processing device 200 of the user at a timing at which the scan separator sheet is read by the image forming apparatus 1, thereby enabling the user to make an instruction pertaining to document reading. Therefore, the user can cause document reading to be performed in accordance with desired reading settings without having to wait by the image reading device until a previously input document reading instruction is complete.

The present disclosure is of course not limited to the configuration in the above embodiment and numerous variations are possible.

<First Variation>

In the image forming apparatus 1 according to the above embodiment, after the reading instruction request section 104 requests an instruction pertaining to document reading from the information processing device 200, the operation control section 102 causes suspension of the document conveying operation of the document conveyance section 6 and the document reading operation of the reading section 7 until the reading instruction reception section 105 receives an instruction pertaining to document reading from the information processing device 200.

In an image forming apparatus 1 according to a first variation, the operation control section 102 causes restarting of the document conveying operation of the document conveyance section 6 and the document reading operation of the reading section 7 in a situation in which the reading instruction reception section 105 does not receive an instruction pertaining to document reading from the information processing device 200 within a preset period of time of the reading instruction request section 104 requesting an instruction pertaining to document reading from the information processing device 200.

Figure 10:
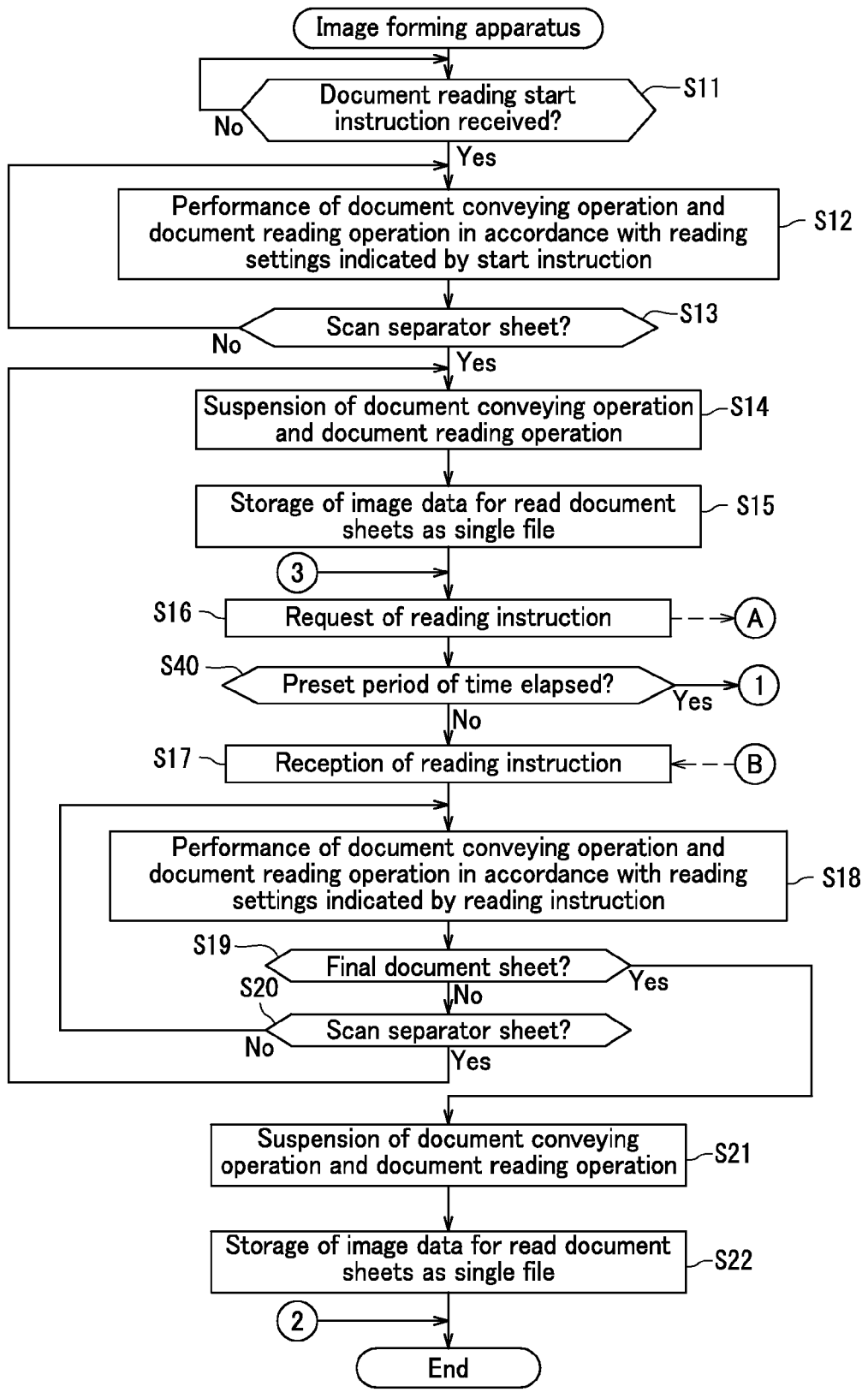
FIG. 10 is a flowchart illustrating operational flow of an information processing device and an image forming apparatus according to a first variation of the present disclosure during a document reading process.
Figure 11:
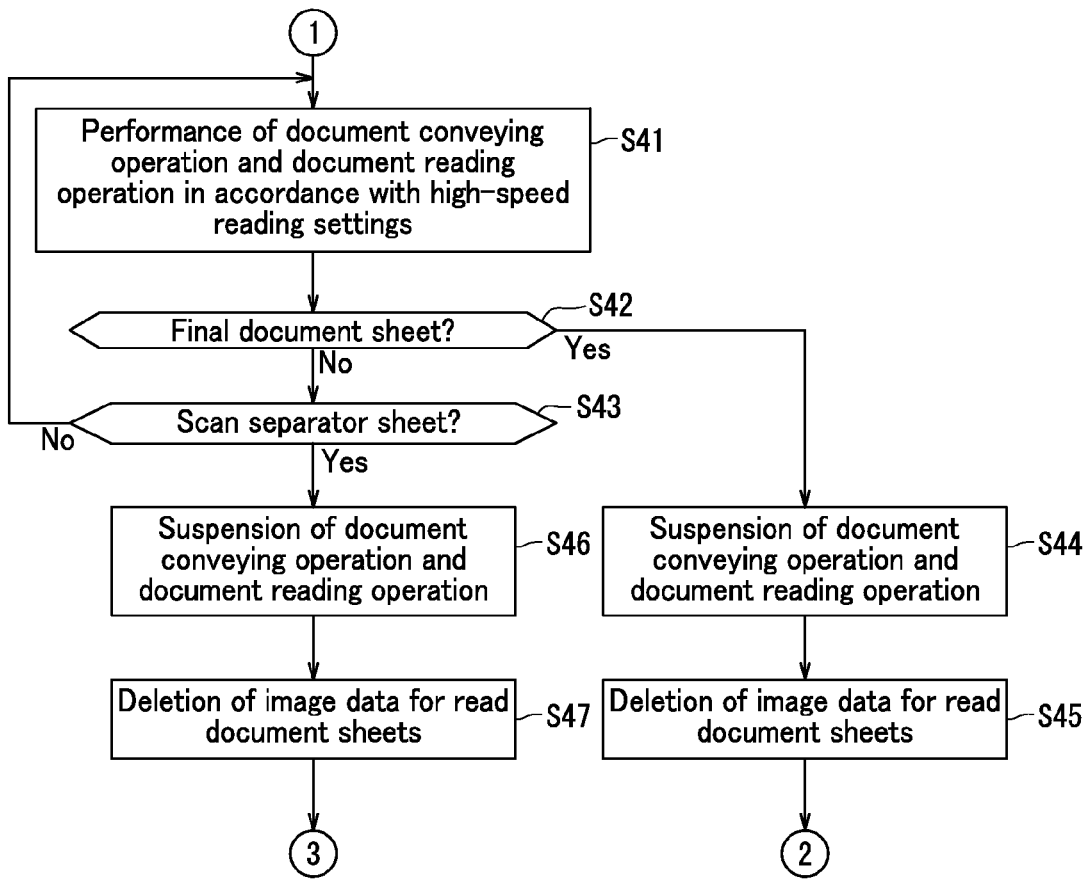
FIG. 11 is a flowchart illustrating operational flow of the information processing device and the image forming apparatus according to the first variation of the present disclosure during the document reading process.

FIGS. 10 and 11 are flowcharts illustrating operational flow of the information processing device 200 and the image forming apparatus 1 according to the first variation. Note that steps that are the same as steps illustrated in FIG. 8 are labelled using the same reference signs and explanation thereof is omitted.

After processing of Step S16, the operation control section 102 determines whether or not a preset period of time has elapsed while waiting for the reading instruction reception section 105 to receive an instruction pertaining to document reading from the information processing device 200 after the reading instruction request section 104 has requested an instruction pertaining to document reading from the information processing device 200 (Step S40).

In a situation in which the preset period of time has elapsed (Step S40: Yes), the operation control section 102 causes skimming of document sheets from a document sheet directly after the scan separator sheet determined in processing of Step S13 through to a final document sheet loaded on the document loading table, or through to a document sheet directly prior to a next scan separator sheet (Steps S41-S45 of FIG. 11).

Note that the term "skimming" refers to document reading performed in accordance with preset high-speed reading settings that prioritize reading speed over reading quality. After determining whether or not a read document sheet is a scan separator sheet, image data that is generated for the read document sheet is deleted from the image memory 20 without being stored as a file in the storage section 60. In the above processing, it is only necessary that a document sheet is read in order to enable determination as to whether or not the read document sheet is a scan separator sheet and thus reading speed is prioritized over reading quality in order to increase processing speed.

In processing of Step S41, the operation control section 102 causes the document conveyance section 6 to perform a document conveying operation and the reading section 7 to perform a document reading operation in accordance with the high-speed reading settings.

In processing of Step S42, the determination section 103 determines whether or not the document sheet read by the reading section 7 in processing of Step S41 is the final document sheet loaded on the document loading table.

In a situation in which the read document is the final document sheet (Step S42: Yes), the operation control section 102 causes suspension of the document conveying operation of the document conveyance section 6 and the document reading operation of the reading section 7 (Step S44). Also, the operation control section 102 deletes image data generated in processing of Step S41 from the image memory 20 (Step S45), thereby ending the document reading process.

On the other hand, in a situation in which the read document sheet is not the final document sheet (Step S42: No), the determination section 103 determines whether or not the document sheet read by the reading section 7 in processing of Step S41 is a scan separator sheet (Step S43).

In a situation in which the read document sheet is not a scan separator sheet (Step S43: No), the process returns to processing of Step S41 and the operation control section 102 causes performance of a document conveying operation and a document reading operation.

In a situation in which the read document sheet is a scan separator sheet (Step S43: Yes), the operation control section 102 causes suspension of the document conveying operation of the document conveyance section 6 and the document reading operation of the reading section 7 (Step S46) and deletes image data that is generated in processing of Step S41 from the image memory 20 (Step S47). After processing of Step S47, the process returns to processing of Step S16.

According to the image forming apparatus 1 of the first variation described above, when a certain user does not input a document reading instruction, a situation can be avoided in which document reading is not performed for other users for an extended period of time.

Figure 12:
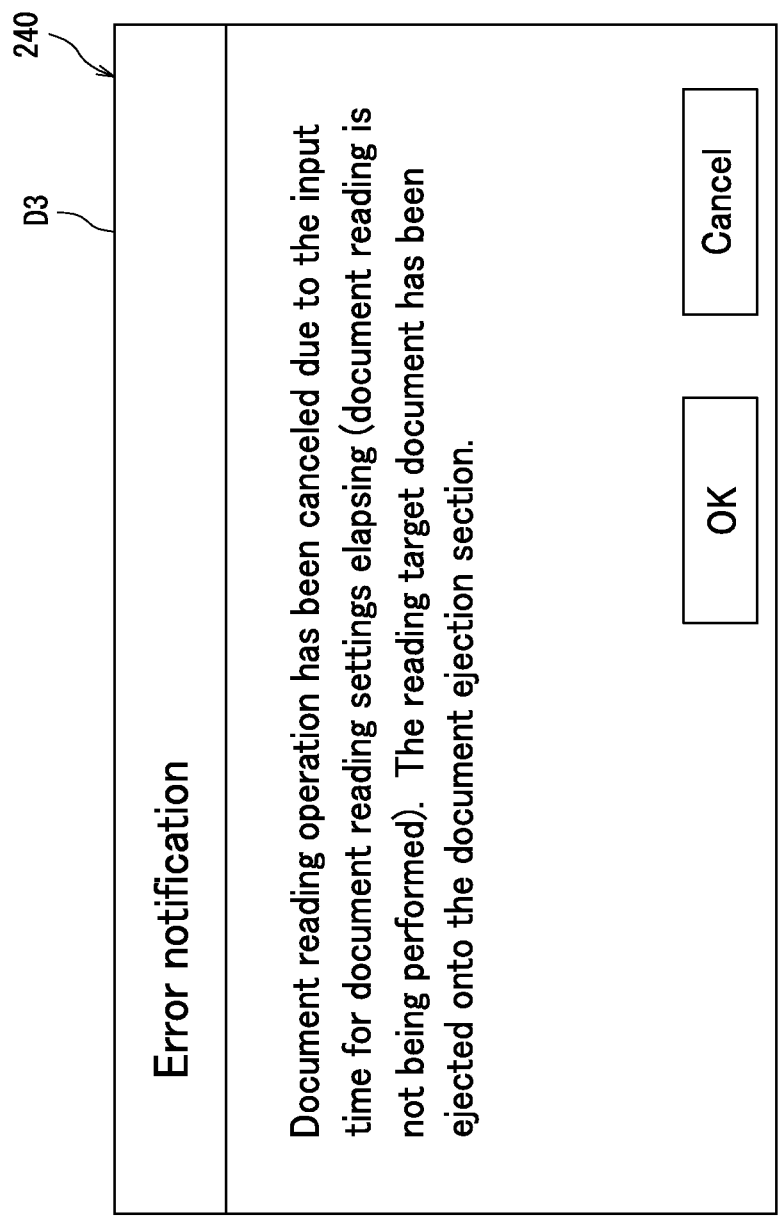
FIG. 12 illustrates an example of content of a notification screen.

Note that in a situation in which skimming is performed by the operation control section 102 as described above, the notification section 106 may transmit a control signal that includes an instruction to perform a notification operation for notifying a user that skimming has occurred. The notification section 106 transmits the aforementioned signal, via the communication interface 70, to the information processing device 200 identified by the identification information indicated by the scan separator sheet. Upon reception of the control signal, the display control section 212 of the information processing device 200 for example causes the display section 240 to display a notification screen D3 illustrated in FIG. 12 in response to the control signal. Through the above, the image forming apparatus 1 can notify the user that a document reading operation has been canceled.

<Second Variation>

In an image forming apparatus 1 according to a second variation, the reading instruction reception section 105 receives designation of a number of document sheets to be read as an instruction pertaining to document reading. The operation control section 102 causes suspension of a document reading operation of the reading section 7 based on the instruction pertaining to document reading when a number of document sheets from a document sheet directly after a scan separator sheet determined by the determination section 103 through to a document sheet directly prior to a next scan separator sheet determined by the determination section 103, or a final document sheet loaded on the document loading table, does not match the number of sheets to be read that is received by the reading instruction reception section 105.

Figure 13:
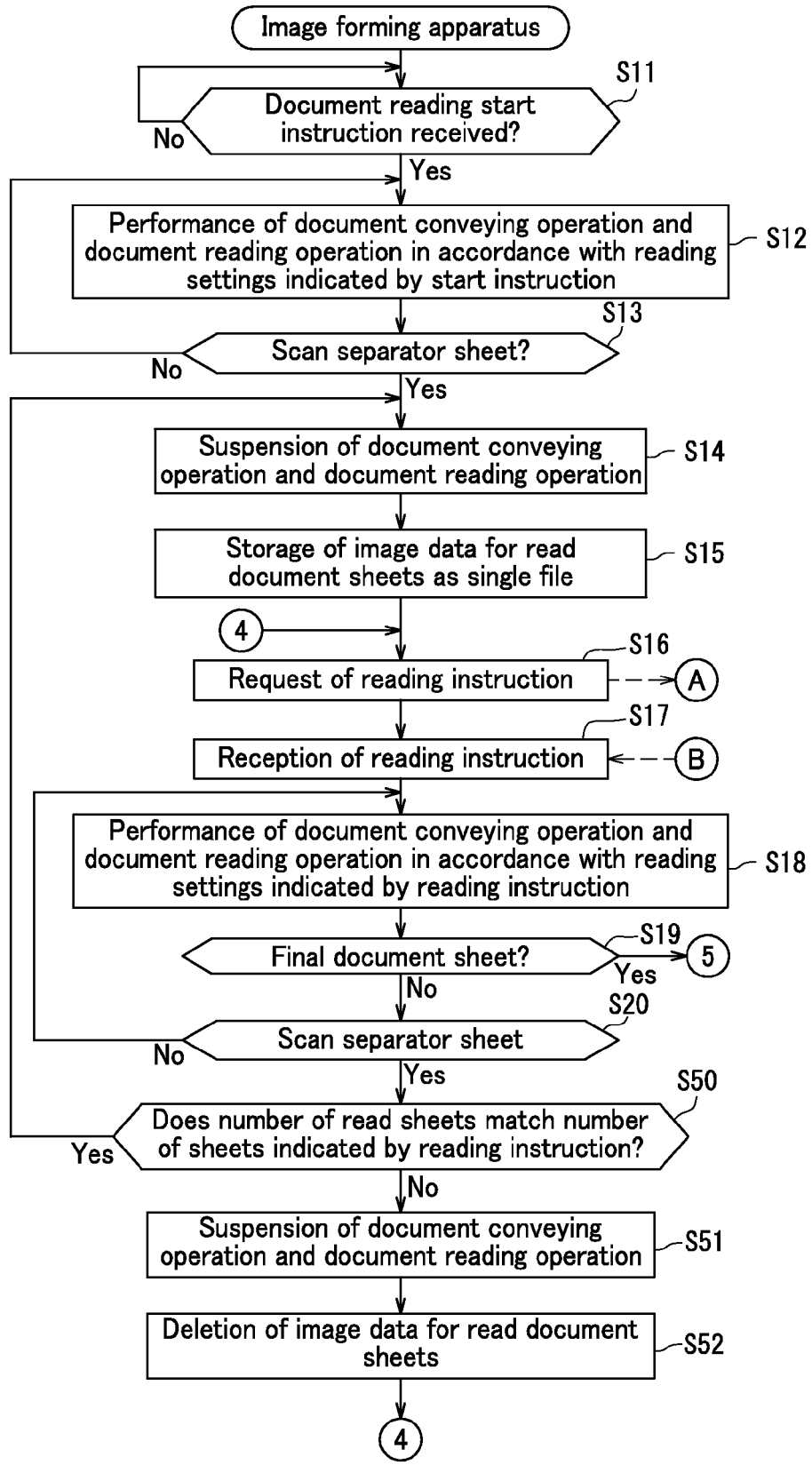
FIG. 13 is a flowchart illustrating operational flow of an information processing device and an image forming apparatus according to a second variation of the present disclosure during a document reading process.
Figure 14:
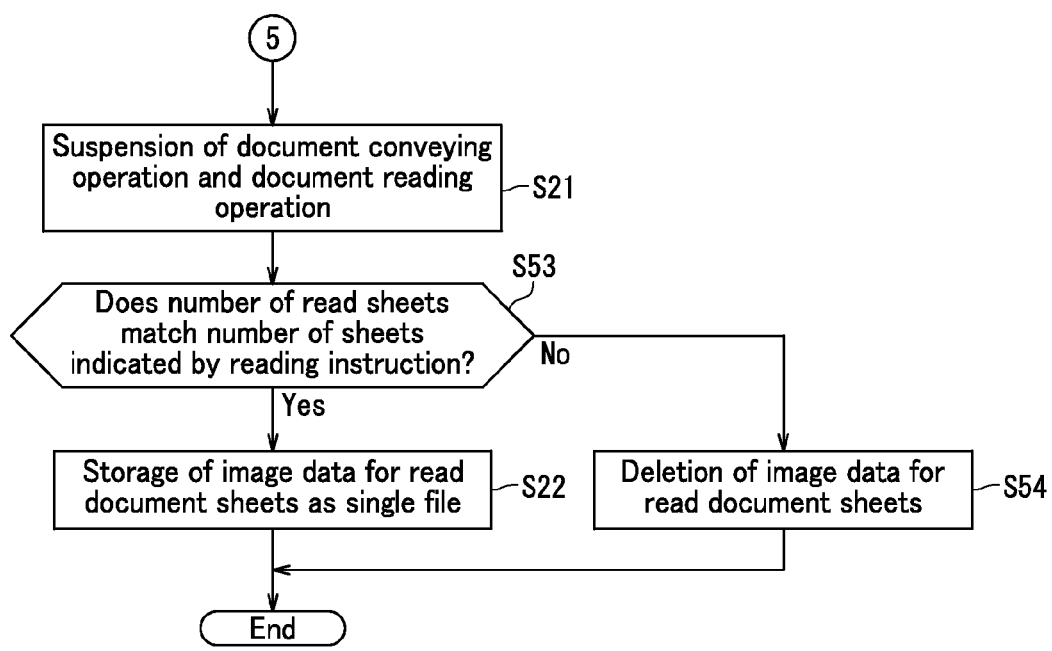
FIG. 14 is a flowchart illustrating operational flow of the information processing device and the image forming apparatus according to the second variation of the present disclosure during the document reading process.

FIGS. 13 and 14 are flowcharts illustrating operation of the information processing device 200 and the image forming apparatus 1 according to the second variation. Note that steps that are the same as steps in FIG. 8 are labelled using the same reference signs and explanation thereof is omitted.

After processing of Step S20, the operation control section 102 determines whether or not a number of document sheets that has been read matches a number of sheets indicated by the reading instruction received in processing of Step S17 (Step S50).

In a situation in which the numbers of sheets match (Step S50: Yes), the process returns to processing of Step S14. On the other hand, in a situation in which the numbers of sheets do not match (Step S50: No), the operation control section 102 causes suspension of the document reading operation of the reading section 7 based on the instruction pertaining to document reading (Steps S51 and S52).

In other words, the operation control section 102 causes suspension of the document conveying operation of the document conveyance section 6 and the document reading operation of the reading section 7 (Step S51), and causes deletion of image data generated in processing of Step S18 from the image memory 20 (Step S52). After processing of Step S52, the process returns to processing of Step S16.

Also, as illustrated in FIG. 14, after processing of Step S21 the operation control section 102 determines whether or not the number of document sheets that has been read matches the number of sheets indicated by the reading instruction received in processing of Step S17 (Step S53).

In a situation in which the numbers of sheets match (Step S53: Yes), with respect to image data generated for document sheets from a document sheet directly after the scan separator sheet determined in processing of Step S13 through to the final document sheet loaded on the document loading table, in processing of Step S22 the operation control section 102 causes storage of the image data as a single file in the storage section 60.

On the other hand, in a situation in which the numbers of sheets do not match (Step S53: No), the operation control section 102 causes deletion of the image data generated in Step S18 from the image memory 20 (Step S54), thereby ending the document reading process.

In a situation in which the number of sheets loaded on the document loading table does not match the number of sheets to be read that is indicated by a user, there is a high probability that a mistake has been made when loading a document. According to the image forming apparatus 1 of the second variation, a document reading operation can be suspended in a situation such as described above in which there is a high probability that a mistake has been made when loading a document.

Figure 15:
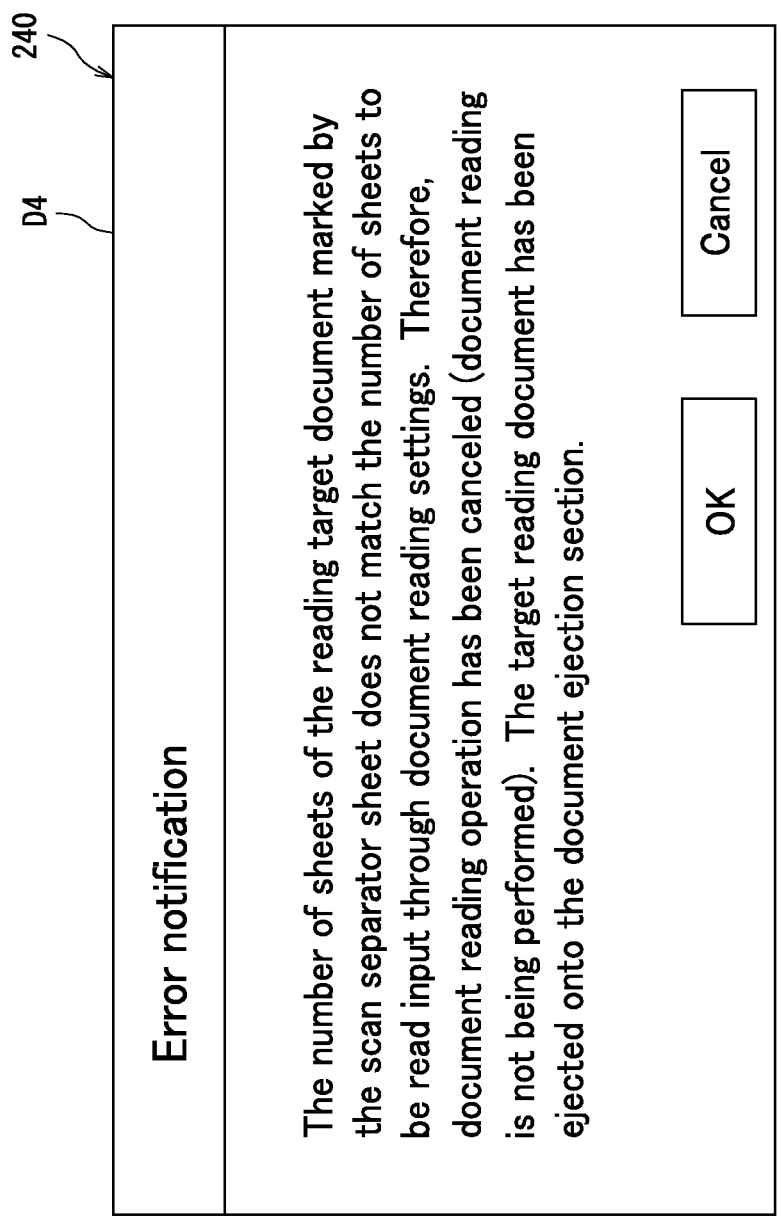
FIG. 15 illustrates an example of content of a notification screen.

Note that in a situation in which the operation control section 102 suspends a document reading operation as described above, the notification section 106 may transmit a control signal including an instruction to perform a notification operation for notifying a user that the document reading operation has been suspended. The notification section 106 transmits the aforementioned control signal, via the communication interface 70, to the information processing device 200 identified by the identification information indicated by the scan separator sheet. Upon reception of the control signal, the display control section 212 of the information processing device 200 for example causes the display section 240 to display a notification screen D4 illustrated in FIG. 15 in response to the control signal. Through the above, the image forming apparatus 1 can notify the user that it is possible that a mistake has been made during loading of a document.

<Other Variations>

The embodiment and variations described above may be freely combined.

Also, the control program explained in the above embodiment may be recorded on a computer readable non-transitory recording medium such as a hard disk, a CD-ROM, a DVD-ROM, or a semiconductor memory. In such a situation, the computer readable non-transitory recording medium having the control program recorded thereon is an embodiment of the present disclosure.

What is claimed is:

1. An image reading device comprising:
   a document conveyance section configured to convey, one by one, document sheets loaded on a document loading table;
   a reading section configured to generate image data by reading a document sheet conveyed by the document conveyance section;
   a determination section configured to determine whether or not the document sheet read by the reading section is an identifier sheet that indicates identification information for identifying, on a network, an information processing device that is a communication target;
   an operation control section configured to control a document conveying operation of the document conveyance section and a document reading operation of the reading section, the operation control section causing suspension of the document conveying operation and the document reading operation upon the determination section determining that the document sheet read by the reading section is an identifier sheet;
   a reading instruction request section configured to, upon the determination section determining that the document sheet read by the reading section is an identifier sheet, communicate with the information processing device identified by the identification information indicated by the identifier sheet, thereby requesting the information processing device for an instruction pertaining to document reading; and
   a reading instruction reception section configured to receive an instruction pertaining to document reading that is transmitted from the information processing device, wherein
   upon the reading instruction reception section receiving the instruction pertaining to document reading, the operation control section:
   causes restarting of the document conveying operation of the document conveyance section and the document reading operation of the reading section; and
   causes the reading section to perform document reading in accordance with a reading setting indicated by the instruction pertaining to document reading in order to generate image data for document sheets from a document sheet directly after the identifier sheet determined by the determination section through to a document sheet directly prior to a next identifier sheet determined by the determination section, or through to a final document sheet loaded on the document loading table.

2. The image reading device according to claim 1, wherein the determination section determines whether or not the document sheet read by the reading section is an identifier sheet by determining whether or not a preset pattern image is printed on the document sheet read by the reading section.

3. The image reading device according to claim 1, wherein when the reading instruction reception section does not receive an instruction pertaining to document reading from the information processing device within a preset period of time after requesting thereof by the reading instruction request section, the operation control section causes restarting of the document conveying operation of the document conveyance section and the document reading operation of the reading section.

4. The image reading device according to claim 3, wherein in a situation in which the operation control section causes restarting of the document conveying operation of the document conveyance section and the document reading operation of the reading section without the reading instruction reception section receiving an instruction pertaining to document reading, the operation control section:
   causes the reading section to perform document reading in accordance with a preset reading setting that prioritizes reading speed over reading image quality in order to generate image data for document sheets from the document sheet directly after the identifier sheet determined by the determination section through to the document sheet directly prior to the next identifier sheet determined by the determination section, or through to the final document sheet loaded on the document loading table; and
   causes deletion of the image data that is generated from a storage section.

5. The image reading device according to claim 1, wherein the reading instruction reception section receives an instruction indicating a number of document sheets to be read as the instruction pertaining to document reading, and
   the operation control section causes suspension of the document conveying operation of the document conveyance section and the document reading operation of the reading section when a number of document sheets from the document sheet directly after the identifier sheet determined by the determination section through to the document sheet directly prior to the next identifier sheet determined by the determination section, or through to the final document sheet loaded on the document loading table, does not match the number of document sheets to be read indicated by the instruction received by the reading instruction reception section.

6. The image reading device according to claim 5, further comprising
a notification section configured to, upon the operation control section causing suspension of the document reading operation of the reading section based on the instruction pertaining to document reading, transmit an instruction to the information processing device for causing the image processing device to perform a notification operation of notifying a user that the document reading operation has been suspended.

7. The image reading device according to claim 1, further comprising:
a reception section configured to receive identification information;
an authorization section configured to perform user authorization based on preset authorization data; and
a printing section configured to print an identifier sheet indicating the identification information received by the reception section in a situation in which the authorization section makes a successful authorization.

* * * * *